Nov. 18, 1958   J. D. SAINT AMOUR ET AL   2,861,243
SHOCK MOUNT AND METER CASING
Filed Dec. 2, 1955
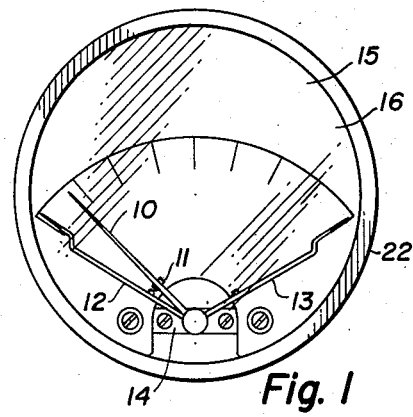
Fig. 1
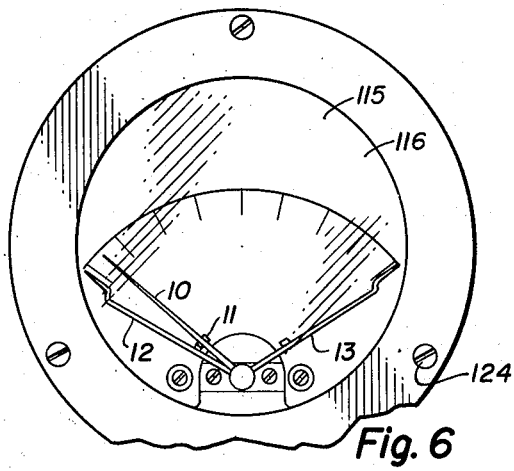
Fig. 6
Fig. 5
Fig. 7
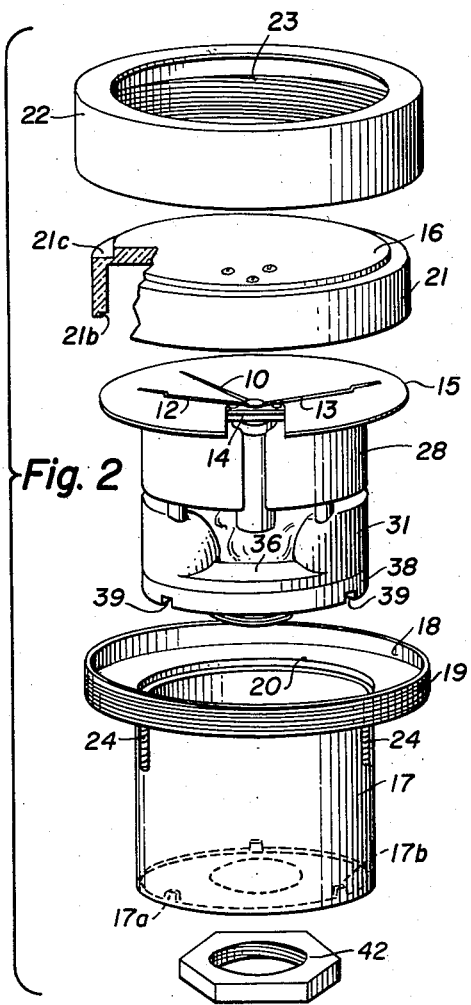
Fig. 2
Fig. 3
Fig. 4
INVENTORS—
GEORGE E. HAMMOND &
JOHN D. SAINT AMOUR
BY Richard H. MacCutcheon
ATTORNEY

United States Patent Office 2,861,243
Patented Nov. 18, 1958

2,861,243

SHOCK MOUNT AND METER CASING

John D. Saint Amour, Chagrin Falls, and George E. Hammond, Euclid, Ohio, assignors to Assembly Products, Inc., Chagrin Falls, Ohio, a corporation of Ohio Application December 2, 1955, Serial No. 550,526

5 Claims. (Cl. 324—156)

The present invention relates to meters having shock mounted movements and/or sealed cases.

For so-called "ruggedizing" and the simultaneous sealing of electrical meters it has heretofore been known to provide resilient gaskets or O-rings adjacent top and bottom of a sealing can to provide somewhat effective seals and at the same time to "float" delicate meter movements with respect to the case thus to guard against damage in locations where unusual shock or vibration or humidity conditions exist.

One difficulty with the past constructions is that they were subject to human error (because there was no shock mounting if a maintenance man should forget sealing gaskets or rings) and, additionally, they resulted in what, in view of the present invention, may be regarded as excessively large and cumbersome structures.

It is an object of the present invention to provide simple means for overcoming the above mentioned difficulty. Another object is to provide improved construction for hermetically sealing while at the same time shock mounting an instrument mechanism.

Other objects and advantages will become apparent and the invention may be better understood from consideration of the following description taken in connection with the accompanying drawing, in which:

Fig. 1 is a full face or top view of a meter in a casing constructed in accordance with the invention;

Fig. 2 is a perspective exploded view showing principal parts making up a meter and casing assembly according to the invention;

Fig. 3 is a view, partly broken away and taken at 90°, to show (with respect to the showing in Figs. 1 and 2) the left side of the casing and meter and underlying resilient mounting horseshoe;

Fig. 4 is a section (on line 4—4 of Fig. 3) through casing and meter permanent magnet;

Fig. 5 is a detail to show the resilient mounting horseshoe with bottom seal ring bonded thereto;

Fig. 6 is a full face view of a meter according to prior art practices; and

Fig. 7 is an exploded cross-section to show top seal construction according to such prior art.

According to the embodiment illustrated in Figs. 1–5, our improved sealed and ruggedized instrument includes the usual moving coil permanent magnet type electrical indicator which, for example, may have a sensitive coil connected to respond to the changes in the operation to be controlled, and mounted for movement with said sensitive coil a second coil which provides an additional or locking torque as described in U. S. Patent 2,576,371, issued November 27, 1951, upon an application by Bradley R. Thompson and George E. Hammond. As described in that patent the coil assembly is mounted on steel pivots and turns in jeweled bearings responsive to interaction of sensitive coil current and permanent magnet field with this action restrained by hairsprings which serve to carry current to and from the movable coil assembly.

A pointer 10 is mounted for movement with the coil assembly and it may carry a contact 11 arranged to mate at adjustable limits of travel as with respective low and high limit contacts provided on adjustable pointers 12 and 13. The meter is provided with a face plate 15 beneath a lens or cover glass 16, and as thus far described the arrangement is more or less conventional.

In accordance with the present invention, the ruggedizing or sealing enclosure comprises a can-like casing 17 having a radially outwardly projecting hollow flange 18 having external threads 19 (see Fig. 2). The hollow flange 18 provides a seat for a rubber or other resilient material gasket ring 20. When the apparatus is in the assembled position of Fig. 3, there is seated upon this ring 20 (which may be referred to as the top sealing ring) the back of the face plate 15 and thereabout a portion of a downwardly projecting rim 21 of the face "glass" 16 which may conveniently be made of transparent plastic material. Preferably the inner lower corner of the rim 21 is provided with a notch 21b to accommodate the face plate O. D. so that the remaining rim portion may directly engage the top sealing ring. Another notch 21c at the upper outer edge of "glass" 16 is provided in order that the latter may be flush with the front of a top bezel ring 22 provided with internal threads 23 designed to mate with the external threads 19 of the case 17 flange 18. If desired the lower side of the flange 18 may be provided with studs 24 for panel mounting of the meter. In accordance with prior practices there is little difficulty in mounting the face plate 15 with respect to the interior mechanism (hence for simplicity such mounting means are not shown) but preferably face plate 15 should be flexible enough so that it does not determine the vertical mounting of the rest of the interior mechanism. The interior mechanism comprises a horseshoe permanent magnet 28 clamped between upper and lower brass plates 29, 30, respectively, and conventional bracket members, such as that shown at 14 in Figs. 1 and 2, for supporting the jewelled bearings in which the moving coil assembly turns. This mechanism is mounted primarily with respect to the casing bottom by means of a rubber (or other resilient material) horseshoe 31 bonded around a metallic horseshoe 32 and around threaded insert means 33 for receiving the ends of mounting screws 34. Such screw receiving means 33 (Fig. 5) project upwardly from attachment with metal horseshoe 32 and somewhat above the rubber horseshoe body and, as shown, above the horseshoe body circumferentially spaced upstanding insert surrounding studs may be of the same resilient rubber material, as by being formed integral with the rubber horseshoe. The screws 34 (Fig. 3) pass through the support plates 29 and 30 to draw them tightly upon the permanent magnet horseshoe 28 and hold it with respect to the rubber mounting horseshoe. The horseshoe of metal 32 is cast right into the rubber horseshoe 31, and at its bottom the rubber horseshoe 31 is bonded to a rubber ring 36 which terminates at its own bottom in an integral half O-ring portion 37 and has at its bottom outer periphery a metal ring 38 notched out at three circumferentially spaced points 39 to mate with corresponding indentations 17a in the casing bottom which comprises an inwardly extending lip 17b (see Fig. 2). Interiorly of this construction the bottom rubber ring 36 is bonded about a metal collar 40 having external threads 41 (Fig. 3) for mating with the interior threads of a nut 42 (Fig. 2). Within the threaded portion of collar 40 an insulating sealing header 43, e. g. of glass, holds meter terminals 44 in place.

As seen in Fig. 4, the magnetic material horseshoe 28 may be provided with holes 46 for accommodating two of the through bolts 34 and with a notch 47 for accommodating the third, and also provided with additional openings 48 for accommodating additional screws (not shown) for holding the bearing brackets (such as 14) and face plate 15 in accordance with conventional practice. The rubber horseshoe 31 and its upstanding mounting studs (rubber surrounded inserts 33) serve not only for shock mounting but also for insulating the interior mechanism against unwanted "grounding," while at the same time the bottom (particularly the O-ring portion) of the rubber mounting assembly serves as an effective seal not apt to become displaced or lost as during disassembly for maintenance purposes. Meanwhile an effective seal is provided at the lens cover, under and around the dial and the design of this seal is such as to allow maximum size of dial for minimum overall size of meter, as may be most clear by comparing with a prior art construction as shown in Figs. 6 and 7 where the limit of the lens glass 116 is determined by the clearance which must be left for the heads of the panel mounting screws 124 located outside of the lens glass and outside of the sealing rubber 120. With the construction of the invention according to Figs. 1–5, however, the mounting studs 24 pass right through the casing flange 18 with this portion of the flange covered by a special metal ring 49 (Fig. 3) for example soldered on to the flange seat (to cover the stud ends) beneath the top sealing ring 20 over which the lens rim 21 is placed, so that a large faced dial may be provided for maximum visibility with respect to over all dimensions, as well as for most effective sealing.

There is thus provided a device of the character described capable of meeting the objects above set forth and providing a construction which is universal while well adapted to endure shock, vibration, high humidity or other unfavorable conditions during operation. While, of course, the degree of resistance to shock and vibration depends to some extent upon sensitivity desired of the internal mechanism, in general we have found that with practices according to the invention it is easy to make relays which will not be permanently damaged by shocks of 100 G's and vibrations up to 2000 C. P. S. at two to four G's and that even under these usually adverse conditions the most sensitive of relays may close their contacts. When meters constructed in accordance with the invention are panel mounted there is less waste panel space but still maximum dial area for clear visibility, and a 2½" O. D. meter may have as big a dial as a former 3½" O. D. meter arranged for dust tight operation.

While we have illustrated and described a particular embodiment, various modifications may obviously be made without departing from the true spirit and scope of the invention which we intend to define in the appended claims.

We claim:

1. In a meter for use in locations where unusual shock, vibration, humidity and/or dirt conditions exist and having an interior meter mechanism comprising a permanent magnet, a can-like casing having at one end thereof a radially inwardly extending annular lip, said casing having interiorly thereof a horseshoe of resilient material containing a metal horseshoe bonded therewithin, threaded means associated with one of said horseshoes and for supporting the permanent magnet with respect to said horseshoes, said resilient horseshoe terminating at its bottom in a full annular ring of resilient material while said full annular ring in turn terminates at its bottom in a half O-ring portion, a bottom sealing header of insulating material interiorly of the full annular ring of resilient material and extending therebelow from within to outside of the casing, an externally threaded metal collar extending downwardly from a bonded connection with the full annular ring of resilient material about the header and through the casing adjacent the lip, and threaded nut means for engaging said collar and drawing the half O-ring portion of the full annular ring into intimate contact with the can lip to complete a seal.

2. In a meter for use in locations where unusual shock, vibration, humidity and/or dirt conditions exist and having an interior meter mechanism comprising a permanent magnet, a coil rotatable with respect to the magnet, a pointer carried for movement with the coil, and a circular dial plate for the pointer, the combination of a can-like casing having at one end thereof a radially outwardly projecting flange provided with external threads and providing a gasket seat, a "top" sealing gasket on the seat, a lens glass having an axially projecting rim seated upon the gasket with the periphery of the dial plate held between the gasket and a portion of the lens rim, a bezel ring having internal threads mating with the casing flange threads to pull the lens and dial plate periphery down upon the gasket, a horseshoe of resilient material located within the casing and containing a metal horseshoe bonded therewithin, threaded means associated with one of said horseshoes and for supporting the permanent magnet with respect to said horseshoes, said resilient horseshoe terminating at its bottom in a full annular ring of resilient material while said full annular ring in turn terminates at its bottom in a half O-ring portion, said casing having at its end opposite the flange end an inwardly extending annular lip, a bottom sealing header material interiorly of the full annular ring of resilient material and extending therebelow, an externally threaded metal collar extending downwardly from a bonded connection with the full annular ring of resilient material around the sealing header material through the lip and out of the casing, and threaded nut means for engaging said collar and drawing the half O-ring portion into intimate contact with the can lip to complete a bottom seal.

3. In a contact meter for use in locations where unusual shock, vibration, humidity and/or dirt conditions exist and having an interior meter mechanism comprising a permanent magnet, a coil rotatable with respect to the magnet, a contact making pointer carried for movement with the coil, and a circular dial plate for the pointer, the combination of a cam-like casing having at one end thereof a radially outwardly projecting flange provided with external threads and providing a gasket seat, a "top" sealing gasket on the seat, a circular lens glass having an axially projecting rim designed to seat in part upon the gasket and being notched out to accommodate the periphery of the dial plate held between the gasket and the notched portion of the lens rim, a bezel ring having internal threads mating with the casing flange threads to pull the lens and dial plate periphery down upon the gasket, a horeshoe of resilient rubber containing a metal horseshoe bonded therewithin, said horseshoes being located interiorly of the casing, threaded means associated with one of said horseshoes and for supporting the permanent magnet with respect to said horseshoes, said resilient rubber horseshoe terminating at its bottom in a full annular ring of resilient rubber while said full annular ring in turn terminates at its bottom in a half O ring portion, said casing having at its end opposite the flange end an inwardly extending annular lip, a bottom sealing header of vitreous material interiorly of the full annular ring of resilient rubber and extending therebelow, an externally threaded metal collar extending downwardly from a bonded connection with the full annular ring of resilient rubber around the header and through the casing adjacent the lip, and threaded nut means for engaging said collar and drawing the half O-ring portion into intimate contact with the can lip to complete a bottom seal.

4. In a contact meter for use in locations where unusual shock, vibration, humidity and/or dirt conditions exist and having an interior meter mechanism comprising a permanent magnet, a coil rotatable with respect to the magnet, a contact making pointer carried for movement with the coil, and a circular dial plate for the pointer, the combination of a can-like casing having at one end thereof a radially outwardly projecting flange, panel mounting studs secured through the flange material, a metal ring soldered "above" the flange material to cover the ends of the studs and to provide a gasket seat, a "top" sealing gasket on the seat, external threads on the casing flange, a circular lens glass having an axially projecting rim seated upon the gasket and being annularly notched out to accommodate the periphery of the dial plate held between the gasket and the notched portion of the lens rim, a second annular notch in the lens rim, a bezel ring having internal threads mating with the casing flange threads and an annular lip mating with said second annular lens rim notch to pull the lens and dial plate periphery down upon the gasket and provide coplanar upper surface mounting of the lens with respect to bezel, a horseshoe of resilient rubber material located within the casing and containing a metal horseshoe bonded therewithin, "upwardly" projecting internally threaded metal inserts bonded at circumferentially spaced points to the metal horseshoe and surrounded by the resilient rubber material horseshoe and thereabove by integrally formed upstanding insert surrounding resilient rubber material studs, the resilient rubber material horseshoe terminating at its bottom in an annular ring of resilient rubber material while said annular ring in turn terminates at its bottom in a half O-ring portion, said casing having at its end opposite the hollow flange end an inwardly extending lip, a bottom sealing header terminal insulating vitreous material interiorly of the annular ring of resilient material and extending therebelow, an externally threaded metal collar extending downwardly from a bonded connection with the annular ring of resilient rubber material around the sealing header vitreous casing through the lip, threaded nut means for engaging said collar and drawing the half O-ring portion into intimate contact with the can lip to complete a bottom seal, and meter terminals extending downwardly out of the sealing header vitreous material.

5. Ruggedizing and sealing construction for a galvanometer type instrument mechanism having a horseshoe permanent magnet, said construction comprising a canlike casing having at one of two ends thereof a radially outwardly projecting flange having external threads and providing a gasket seat, a sealing gasket on the seat, a circular lens glass having an axially projecting rim seated upon the sealing gasket, a bezel ring having internal threads mating with the casing flange threads and thereby pulling the lens glass "down" upon the gasket, a panel mounting screws mounted within the flange directly "beneath" the gasket, a horseshoe of resilient material containing a metal horseshoe bonded therewithin with said horseshoes located interiorly of the casing adjacent the end thereof opposite the outwardly projecting flange end, threaded means associated with at least one of said last mentioned horseshoes for supporting the instrument mechanism permanent magnet horseshoe "upon" and with respect to the resilient material horseshoe, said canlike casing having at its end opposite the outwardly projecting flange end an inwardly extending lip, said resilient material horseshoe terminating at its "bottom" in a full annular ring of resilient material adjacent said lip, a "bottom" sealing header material interiorly of the annular ring of resilient material and extending "therebelow," an externally threaded metal collar extending "downwardly" from a bonded connection with the full annular ring of resilient material and about the header material through and without the casing adjacent the lip, and threaded nut means engaging said collar and drawing the collar and hence the full annular ring of resilient material into engagement with the can lip for sealing and ruggedizing.

References Cited in the file of this patent

UNITED STATES PATENTS

| | | |
|---|---|---|
| 2,517,171 | Bernreuter | Aug. 1, 1950 |
| 2,581,734 | Triplett | Jan. 8, 1952 |
| 2,710,377 | Pfeffer | June 7, 1955 |